June 7, 1966 R. L. BROOKE 3,254,724
ROTOR MOUNTING MEANS
Filed Aug. 14, 1964 4 Sheets-Sheet 4
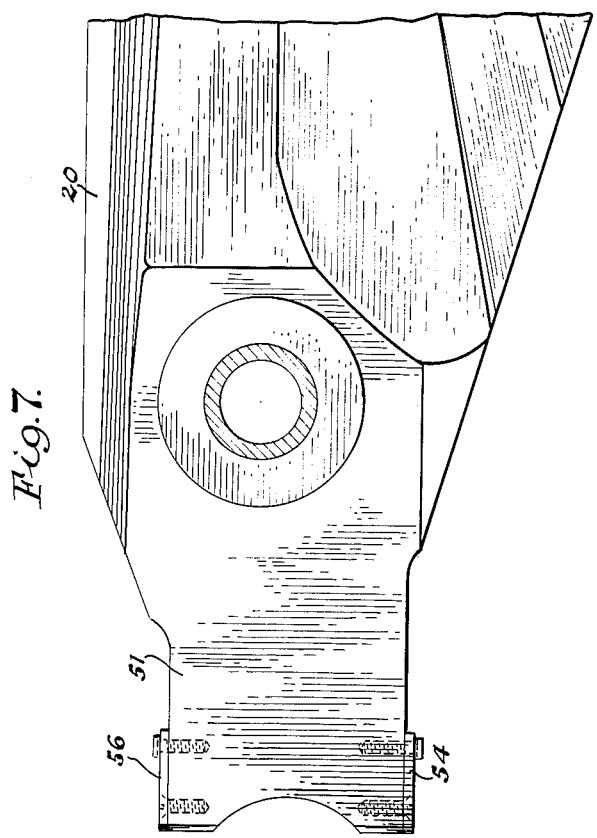
INVENTOR.
ROYSE L. BROOKE
BY
Bean, Brooks, Buckley + Bean
ATTORNEYS

United States Patent Office 3,254,724
Patented June 7, 1966

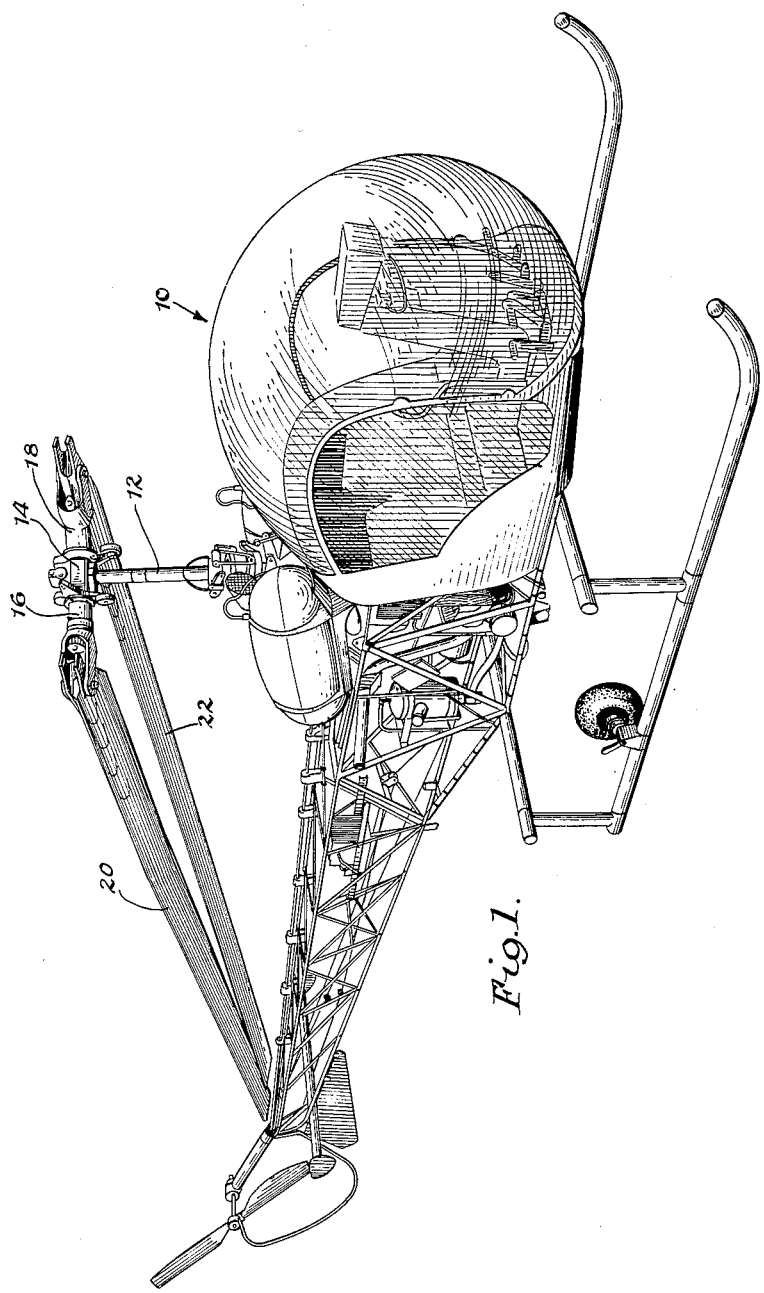

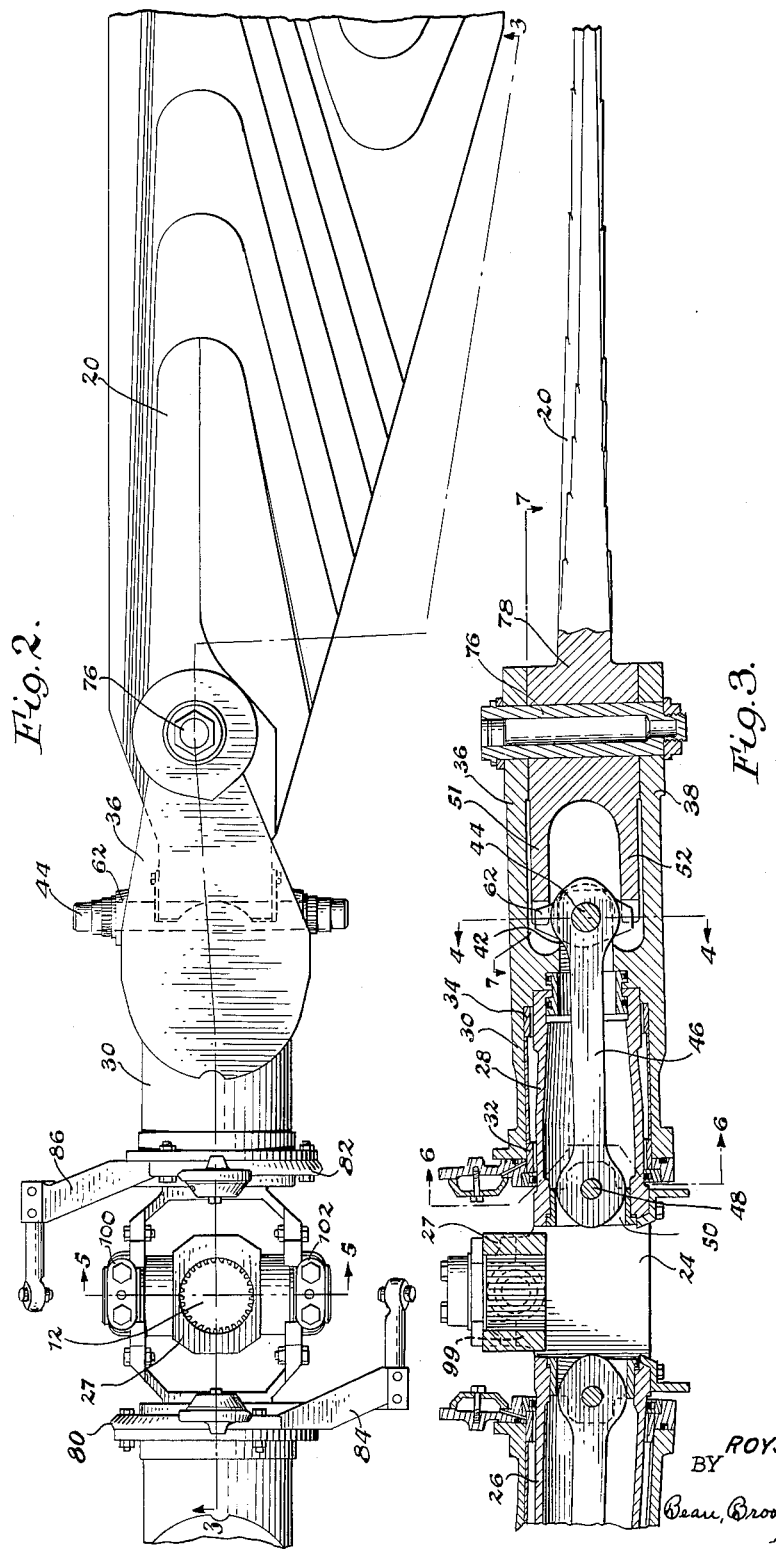

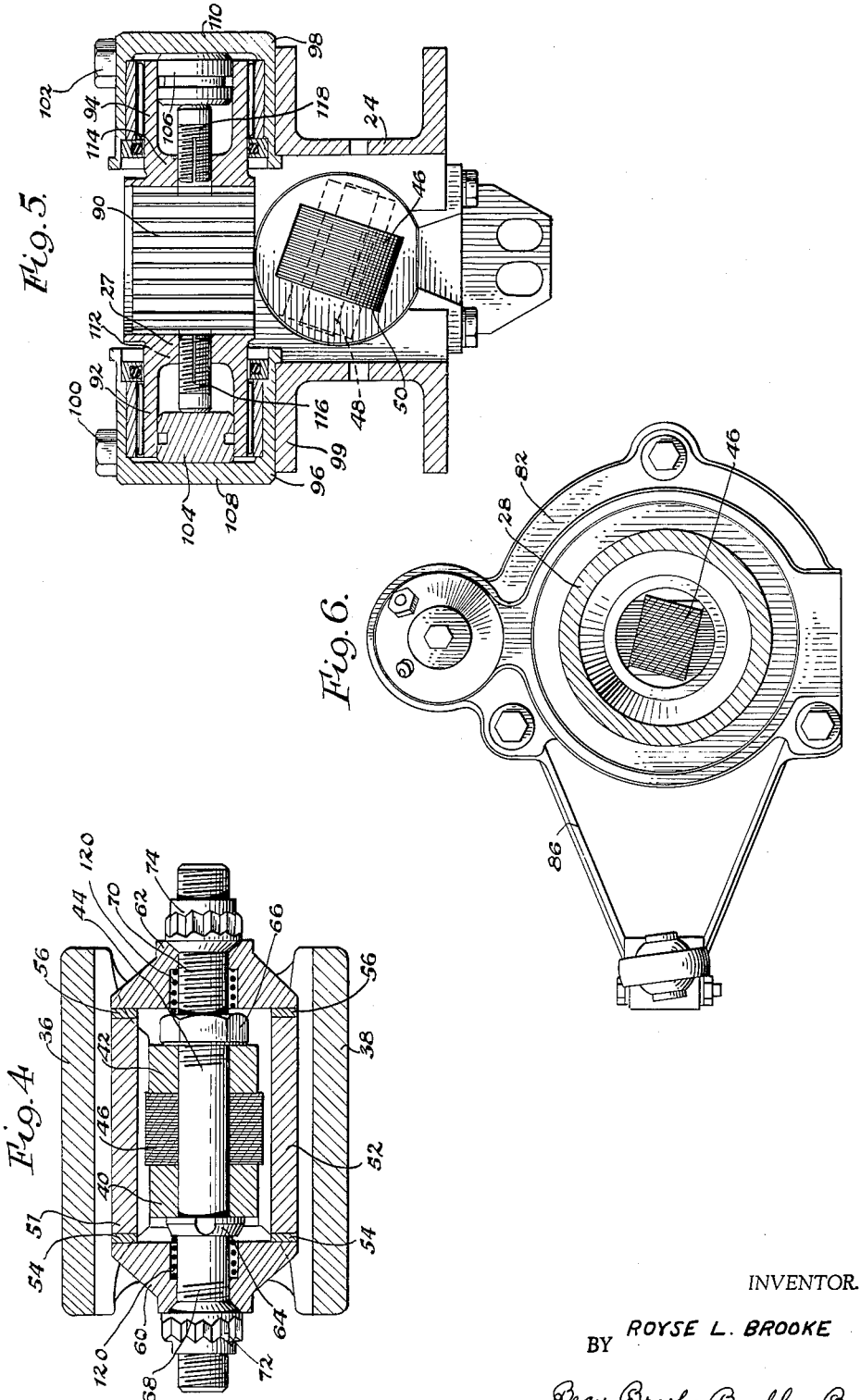

3,254,724
ROTOR MOUNTING MEANS
Royse L. Brooke, Dallas, Tex., assignor to
Bell Aerospace Corporation
Filed Aug. 14, 1964, Ser. No. 389,724
5 Claims. (Cl. 170—160.12)

This invention relates to rotary wing aircraft and pertains in particular to improved mounting means for blades or wings thereof.

In rotary wing aircraft such as helicopters, it is frequently necessary and desirable that the several blades thereof be disposed in generally side-by-side folded condition so that the aircraft may be stored or transported. Obviously, it is desirable that such folding be permitted with minimum effort and expenditure of time. It is of primary concern in connection with this invention to provide improved blade mounting means which accommodates for such action.

More particularly, it is an object of this invention to provide an improved blade mounting means as aforesaid in which a generally vertical pivot pin allows for pivotal motion of the blades about an axis generally parallel to the axis of the rotor, there being abutment means engaging the blades for normally fixing the blades against such pivotal motion but which abutment means are capable of being manipulated to clear the blades and allow such motion.

Ancillary to the above, it is an object of this invention to provide blade mounting means as aforesaid in which the abutment means are shiftable to alter the fixed lead-lag position of a blade.

Other objects and advantages of the invention will appear from the description hereinbelow and the accompanying drawing wherein:

FIG. 1 is a perspective view of a helicopter employing the blade mounting means according to the present invention and illustrating the blades thereof in folded condition;

FIG. 2 is a top plan view of a portion of the rotor assembly according to the present invention;

FIG. 3 is a longitudinal section taken substantially along the plane of section line 3—3 in FIG. 2;

FIG. 4 is an enlarged vertical section taken substantially along the plane of section line 4—4 in FIG. 3;

FIG. 5 is an enlarged vertical section taken substantially along the plane of section line 5—5 in FIG. 2;

FIG. 6 is an enlarged vertical section taken substantially along the plane of section line 6—6 in FIG. 3; and FIG. 7 is a plan view of the root end portion of one of the blades.

With reference now more particularly to FIG. 1, the helicopter is indicated generally therein by the reference character 10 and will be seen to include a rotor 12 to the upper end of which is attached a hub assembly 14. The hub assembly 14 pivotally mounts a pair of diametrically opposed blade grip members 16 and 18 and the blade grip members 16 and 18 in turn mount blade members 20 and 22. The manner of mounting the blade members 20 and 22 is such as to permit of their disposition in the folded condition as is illustrated in FIG. 1 in a very simple and efficient manner while, at the same time, normally disposing the blades in diametrically opposed relationship or operative position as will be well understood by those skilled in the art. The manner in which the above is accomplished may be seen more clearly from a study of FIG. 3. In this figure, it will be seen that the hub assembly 14 includes a main body portion 24 which is pivotally attached to the rotor 12 about a transverse seesaw axis by means of the trunnion assembly 27, hereinafter more particularly described, the main body portion 24 of the rotor having diametrically opposed tubular extensions 26 and 28. Each of the blade grip members 16 and 18 includes a tubular body portion 30 which receives and surrounds a respective extension 26 or 28 and bearing means 32 and 34 are interposed between the tubular extensions 26 and 28 and the corresponding body portions 30 of the blade grip members so as to permit the blade grip members to rotate about the tubular extensions for pitch change motion of the associated rotor blades. Each of the blade grip members also includes a pair of vertically spaced plate-like extension portions 36 and 38 and housed between the inner ends of these extensions 36 and 38 and disposed in horizontally spaced relationship are a pair of apertured lugs 40 and 42, see particularly FIG. 4.

The lugs 40 and 42 mount a horizontally disposed transverse anchor member 44 (FIG. 4) and the outer end of a tension-torsion strap 46 is provided with an eye receiving the anchor member 44 and the strap extends inwardly into the corresponding tubular extension 26 or 28 and is pinned, as at 48, at its inner end to an anchor block member 50. The anchor block 50 seats on the inner end face of the corresponding tubular extension 26 or 28 and suitable means is provided (not shown) to lock the anchor block 50 against rotation relative to the corresponding extension 26 or 28. Thus, the tension-torsion strap 46 prevents axial separation between the extensions 26 and 28 and the corresponding blade grip members and also serves to torsionally center the blade grip members relative to the hub assembly for returning the blades 20 and 22 to their "neutral" position as will be well understood by those skilled in the art.

The root ends of each of the blades 20 and 22 is bifurcated to provide the horizontally spaced legs 51 and 52 which are spaced apart a sufficient distance to straddle the anchor member 44 and the lugs 40 and 42 substantially as is shown in FIG. 4. The opposite side edges of the legs 51 and 52 are provided with hardened wear blocks 54 and 56 for engagement by lozenged-like abutment members 60 and 62 carried by the anchor member 44, see particularly FIG. 4. The anchor member 44 may be provided with an integral shoulder member 64 adapted to seat against the outer face of the lug 40, as shown, and a securing nut 66 is preferably threaded on the opposite ends of the anchor member 44 serving to lock the anchor member securely against longitudinal displacement relative to the lugs 40 and 42.

The opposite ends of the anchor member 44 are threaded as indicated by reference characters 68 and 70 to receive the nut members 72 and 74 substantially as is shown. As stated, the abutment members 60 and 62 are wing-like as can be seen more clearly in FIGS. 1 and 3 and their smaller dimensions are such as to be passed between the legs 50 and 52 of the blade members so that a quarter turn of one of the abutment members will permit the legs 50 and 52 to clear the same for disposition into and out of the folded position. The extremities of the extensions 36 and 38 of the blade grip members carry a vertical pivot pin 76, see particularly FIG. 3, which passes through the solid body portions 78 at the root ends of the respective blades 20 or 22, it being appreciated that the abutment members 60 and 62 normally fix the blades against pivotal motion about the pins 76 so that the blades are disposed in radially extending positions for operative action.

Secured to the inner ends of the tubular body portions 30 of the blade grip members are annular plate members 80 and 82 having horn members 84 and 86 thereon for attachment to control mechanism (not shown) to impart the desired pitch change adjustment to the respective blades 20 and 22, as will be well understood by those skilled in the art. The blade assembly illustrated is of the so-called "seesaw" type with the transverse axis of the seesaw being disposed above the longitudinal pitch change axes of the blades 20 and 22. The aforementioned trunnion member 27 is internally spined as at 90 to receive the upper end of the rotor 12 and the member 27 is provided with diametrically opposed trunnion portions 92 and 94 received in the pillow block assemblies 96 and 98, which pillow blocks 96 and 98 are received in saddles 99 formed in the body 28 of the hub assembly and which are retained therein by the members 100 and 102 engaging the body portion 24. The trunnion portions 92 and 94 are hollow, substantially as is shown in FIG. 5 and thrust buttons 104 and 106 which seat against the inner faces of the end walls 108 and 110 of the pillow blocks 96 and 98. The inner wall portions 112 and 114 of the trunnion portions 92 and 94 are screwthreaded to receive the thrust adjusting screwthread members 116 and 118 which are adjusted to bear against the thrust buttons 104 and 106 to thereby locate the hub assembly and, consequently, the rotor 12 transversely relative to the trunnion body 28.

Springs 120 fit into the annular grooves between the threaded portions 68 and 70 and the abutment members 60 and 62. When nut 72 or 74 is backed off from the anchor member 44, the spring 120 will force its respective abutment member out against the nut to permit easier access by the mechanic to the abutment member.

It will be appreciated that combination of the anchor member 44 and pivot pin 76 will provide a very rigid mounting for the blade inasmuch as these members are spaced in a longitudinal direction and can thereby be separated a sufficient distance to achieve the necessary moment arm without requiring extremely rugged construction of these elements. At the same time, loosening one of the abutment members and rotating it 90° will permit the legs 51 and 52 of the blade member to clear such rotated abutment means and allow the blade to be disposed in folded condition as for example as shown in FIG. 1. At the same time, it will be appreciated that the anchor member 44 and the abutment members 60 and 62 present means by which lead-lag adjustments of the blade member can be accomplished. This type of adjustment is extremely beneficial in positioning the blade as desired in the lead-lag plane, for example in aligning the longitudinal center of gravity axis of each blade so that an extension thereof intersects the axis of the rotor 12, with attendant advantages in performance. Referring to FIG. 4, this adjustment is obtained in one direction (lead or lag) by backing nut 74 off the threaded portion 70 of anchor member 44, and threading nut 72 further on the threaded portion 68 of anchor member 44, which will push 60 against the legs 51, 52 of the blade 20 so as to rotate the blade around pin 76. Of course, to adjust the blade in the other direction, nut 72 is backed off and nut 74 is threaded further on anchor member 44.

It is to be understood that certain changes and modifications as illustrated and described may be made without departing from the spirit of the invention or the scope of the following claims.

I claim:
1. In a rotary wing aircraft, in combination,
a generally upright rotor,
blade mounting means connected to said rotor for rotation therewith and having vertically spaced plate-like extensions,
an elongate blade member having a root end portion terminating in a pair of vertically spaced leg portions, said root end portion being received between said extensions of the blade mounting means,
a generally vertical pivot pin extending through said extensions of the blade mounting means and said root end portion of the blade member and pivotally interconnecting the blade mounting means and the blade member to permit the latter to move between operative and folded positions,
a generally horizontal anchor member carried by said blade mounting means transversely thereof and between said extensions thereof, said legs of the blade member being disposed in straddling relation to said anchor member when the blade member is in its operative position,
and abutment members on the opposite ends of said anchor member and engaging the legs of said blade member for holding the blade member in its operative position, at least one of said abutment members being movable to clear and be passed between the legs of said blade member and permit the blade member to be moved to its folded position about said pivot pin.

2. In a rotary wing aircraft, in combination,
a generally upright rotor,
a hub connected to said rotor for rotation therewith and having a tubular extension projecting radially of the rotor,
a blade grip member having a body portion receiving said tubular extension of the hub and having a pair of vertically spaced plate-like members projecting beyond said body portion and the tubular extension of the hub received thereby,
bearing means interposed between said extension of the hub and said body portion of the blade grip member,
a generally horizontal anchor pin carried by said blade grip member between said plate-like members and adjacent said body portion,
a blade member having a root end portion received between said plate-like members of the hub and terminating in vertically spaced legs straddling said anchor pin,
a generally vertical pivot pin projecting through said plate-like members of the hub and said root end portion of the blade member beyond said anchor pin,
abutment means on the opposite ends of said anchor pin and engaging the legs of said blade member to normally prevent the blade member from pivoting about said pivot pin, at least one of said abutment means being movable to a position clearing said legs to permit the blade member to fold relative to said blade grip member at said pivot pin.

3. In a rotary wing aircraft, in combination,
a generally upright rotor,
a hub connected to said rotor for rotation therewith and having a tubular extension projecting radially of the rotor,
a blade grip member having a body portion receiving said tubular extension of the hub and having a pair of vertically spaced plate-like members projecting beyond said body portion and the tubular extension of the hub received thereby,
bearing means interposed between said extension of the hub and said body portion of the blade grip member,
a generally horizontal anchor pin carried by said blade grip member between said plate-like members and adjacent said body portion,
a blade member having a root end portion received between said plate-like members of the hub and terminating in vertically spaced legs straddling said anchor pin,
a generally vertical pivot pin projecting through said plate-like members of the hub and said root end portion of the blade member beyond said anchor pin,
abutment means on the opposite ends of said anchor pin and engaging the legs of said blade member to normally prevent the blade member from pivoting about said pivot pin, at least one of said abutment means being movable to a position clearing said legs to permit the blade member to fold relative to said blade grip member at said pivot pin,
an elongate torsion member anchored at its inner end to said hub member and projecting through said tubular extension thereof, the outer end of the torsion member being secured to said anchor pin.

4. In a rotary wing aircraft, in combination,
a generally upright rotor,
a hub member connected to said rotor for rotation therewith and having a tubular extension,
an elongate blade grip member having a tubular body portion at its inner end surrounding said tubular extension of the hub member, and having a pair of vertically spaced plate-like extensions at its outer end and a pair of horizontally spaced lugs between said plate-like extensions adjacent said tubular body portion,
a rotor blade having an inner end portion received between said plate-like extensions of the blade grip member and terminating in a pair of vertically spaced legs clearing said lugs,
a generally vertical pivot pin projecting through said plate-like extensions and the intervening inner end of said rotor blade,
a tension-torsion member anchored at one end to said hub member and projecting through said tubular extension thereof to the region between said lugs of the blade grip members,
an anchor member projecting through said lugs and the intervening portion of said tension-torsion member, and abutment members carried by said anchor member and clamping said legs of the rotor blade therebetween to normally fix said rotor blade against rotation about said pivot pin.

5. In the rotary wing aircraft according to claim 4 wherein said abutment members are threaded on said anchor member to adjustably position said rotor blade about said pivot pin relative to said blade grip member.

References Cited by the Examiner

UNITED STATES PATENTS

| 1,948,457 | 2/1934 | Larsen | 170—160.55 |
| 1,950,080 | 3/1934 | Cierva | 170—160.55 |
| 2,696,271 | 12/1954 | Jovanovich | 170—160.55 |
| 2,830,669 | 4/1958 | Klockner. | |
| 2,863,514 | 12/1958 | Payne | 170—160.56 |
| 2,966,947 | 1/1961 | Batesole | 170—160.12 |
| 3,026,942 | 3/1962 | Cresap | 170—160.53 X |

FOREIGN PATENTS 751,109  6/1956  Great Britain.

SAMUEL LEVINE, *Primary Examiner.*

JULIUS E. WEST, *Examiner.*

E. A. POWELL, *Assistant Examiner.*